US011910231B2

(12) United States Patent
Hu et al.

(10) Patent No.: US 11,910,231 B2
(45) Date of Patent: Feb. 20, 2024

(54) DELAY MEASUREMENT METHOD AND APPARATUS

(71) Applicant: HUAWEI TECHNOLOGIES CO., LTD., Guangdong (CN)

(72) Inventors: Xingxing Hu, Shanghai (CN); Qinghai Zeng, Shanghai (CN); Hongping Zhang, Shanghai (CN); Xing Liu, Shenzhen (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/231,712

(22) Filed: Apr. 15, 2021

(65) Prior Publication Data
US 2021/0235317 A1    Jul. 29, 2021

Related U.S. Application Data

(63) Continuation of application No. PCT/CN2019/111053, filed on Oct. 14, 2019.

(30) Foreign Application Priority Data

Oct. 16, 2018 (CN) .......................... 201811205103.6

(51) Int. Cl.
*H04W 28/04* (2009.01)
*H04B 17/364* (2015.01)
(Continued)

(52) U.S. Cl.
CPC .......... *H04W 28/04* (2013.01); *H04B 17/364* (2015.01); *H04L 27/26025* (2021.01); *H04W 72/0446* (2013.01); *H04W 72/0453* (2013.01)

(58) Field of Classification Search
CPC ............ H04W 28/04; H04W 72/0446; H04W 72/0453; H04W 24/08; H04B 17/364;
(Continued)

(56) References Cited

U.S. PATENT DOCUMENTS

| 2004/0136345 | A1* | 7/2004 | Yano ..................... H04W 36/18 370/335 |
| 2017/0171766 | A1* | 6/2017 | Amizur ................. H04W 24/08 |

FOREIGN PATENT DOCUMENTS

| CN | 101931981 A | 12/2010 |
| CN | 106162728 A | 11/2016 |

(Continued)

OTHER PUBLICATIONS

Huawei, HiSilicon, "Solution of time synchronization," SA WG2 Meeting #129, S2-1810788, Dongguan, P.R. China, Oct. 15-19, 2018, 5 pages.

(Continued)

*Primary Examiner* — Dady Chery
(74) *Attorney, Agent, or Firm* — Fish & Richardson P.C.

(57) ABSTRACT

The present disclosure relates to delay measurement methods and apparatus. In one example method, a first communications device receives a data unit from a second communications device, where the data unit includes time information, the time information is used to indicate a first moment at which the second communications device sends the data unit, and the time information indicates the first moment based on a part of bits of a frame number. The first communications device determines a delay from the second communications device to the first communications device based on the first moment and a second moment, where the second moment is a moment at which the first communications device receives the data unit.

20 Claims, 8 Drawing Sheets

(51) Int. Cl.
*H04L 27/26* (2006.01)
*H04W 72/0446* (2023.01)
*H04W 72/0453* (2023.01)

(58) Field of Classification Search
CPC .......... H04L 27/26025; H04L 43/0864; H04L 43/0858; H04L 43/0852
See application file for complete search history.

(56) References Cited

FOREIGN PATENT DOCUMENTS

| | | |
|---|---|---|
| CN | 106454921 A | 2/2017 |
| WO | 2014026546 A1 | 2/2014 |
| WO | 2017026687 A1 | 2/2017 |

OTHER PUBLICATIONS

Office Action issued in Chinese Application No. 201811205103.6 dated Jan. 26, 2022, 4 pages.
Extended European Search Report issued in European Application No. 19873502.9 dated Dec. 15, 2021, 9 pages.
Huawei et al., "QoS Monitoring," 3GPP TSG-SA WG1 Meeting #82, SI-181714, Dubrovnik, Croatia, May 7-11, 2018, 3 pages.
International Search Report and Written Opinion in International Application No. PCT/CN2019/111053, dated Jan. 6, 2020, 15 pages.

\* cited by examiner

DELAY MEASUREMENT METHOD AND APPARATUS

CROSS-REFERENCE TO RELATED APPLICATIONS

This application is a continuation of International Application No. PCT/CN2019/111053, filed on Oct. 14, 2019, which claims priority to Chinese Patent Application No. 201811205103.6, filed on Oct. 16, 2018. The disclosures of the aforementioned applications are hereby incorporated by reference in their entireties.

TECHNICAL FIELD

This application relates to the communications field, and in particular, to a delay measurement method and apparatus.

BACKGROUND

As communications technologies develop and communication requirements increase, an increasing quantity of services needs a function of ensuring a low latency. To ensure service performance, an operator needs to know delay performance of a current network. For example, in a process in which an access network device communicates with a terminal device, the access network device needs to measure a delay between the terminal device and the access network device, to facilitate data transmission or data scheduling. In the conventional technology, there are a plurality of delay measurement methods, but requirements on communications technologies are increasingly high. Therefore, how to reduce signaling overheads and improve communication efficiency in a delay measurement process is still a subject of research in the industry.

SUMMARY

This application provides a delay measurement method and apparatus, to reduce signaling overheads.

According to a first aspect, a delay measurement method is provided. The method includes: A first communications device receives a data unit from a second communications device, where the data unit includes time information, the time information is used to indicate a first moment at which the second communications device sends the data unit, and the time information indicates the first moment based on a part of bits of a frame number; and the first communications device determines a delay from the second communications device to the first communications device based on the first moment and a second moment, where the second moment is a moment at which the first communications device receives the data unit.

In this embodiment of this application, in a delay measurement process, a moment may be indicated based on the part of bits of the frame number, so that signaling overheads can be reduced.

In this embodiment of this application, the first moment at which the second communications device sends the data unit may be indicated based on the part of bits of the frame number, and the first communications device may determine the delay from the second communications device to the first communications device based on the second moment at which the data unit is received and the first moment, thereby reducing signaling overheads.

With reference to the first aspect, in some possible implementations of the first aspect, the part of bits of the frame number includes last N bits of the frame number, and N is an integer greater than or equal to 1.

With reference to the first aspect, in some possible implementations of the first aspect, the time information includes at least one of the following: the part of bits of the frame number corresponding to the first moment, a subframe number corresponding to the first moment, a slot sequence number corresponding to the first moment, or a symbol sequence number corresponding to the first moment.

With reference to the first aspect, in some possible implementations of the first aspect, the time information corresponds to a first subcarrier spacing.

In this embodiment of this application, the time information may correspond to a subcarrier spacing, to more accurately determine each moment used for delay measurement, and even if the subcarrier spacing changes in a data unit sending process, each moment used for delay measurement may be accurately determined based on a corresponding subcarrier spacing.

With reference to the first aspect, in some possible implementations of the first aspect, the method further includes: The first communications device sends delay information to the second communications device, where the delay information includes the delay.

With reference to the first aspect, in some possible implementations of the first aspect, the first communications device is a terminal device, and the second communications device is an access network device.

According to a second aspect, a delay measurement method is provided. The method includes: A second communications device sends a data unit to a first communications device, where the data unit includes time information, the time information is used to indicate a first moment at which the second communications device sends the data unit, and the time information indicates the first moment based on a part of bits of a frame number; and the second communications device receives delay information from the first communications device, where the delay information indicates a delay from the second communications device to the first communications device, the delay is determined based on the first moment and a second moment, and the second moment is a moment at which the first communications device receives the data unit.

With reference to the second aspect, in some possible implementations of the second aspect, the part of bits of the frame number includes last N bits of the frame number, and N is an integer greater than or equal to 1.

With reference to the second aspect, in some possible implementations of the second aspect, the time information includes at least one of the following: the part of bits of the frame number corresponding to the first moment, a subframe number corresponding to the first moment, a slot sequence number corresponding to the first moment, or a symbol sequence number corresponding to the first moment.

With reference to the second aspect, in some possible implementations of the second aspect, the time information corresponds to a first subcarrier spacing.

With reference to the second aspect, in some possible implementations of the second aspect, the first communications device is a terminal device, and the second communications device is an access network device.

According to a third aspect, a delay measurement method is provided. The method includes: A second communications device sends a first data unit to a first communications device; the second communications device receives a second data unit from the first communications device, where the second data unit includes first time information, the first time information is used to indicate a second moment at which the first communications device receives the first data unit, and the first time information indicates the second moment based on a part of bits of a frame number; and the second communications device determines a first delay from the second communications device to the first communications device based on a first moment and the second moment, where the first moment is a moment at which the second communications device sends the first data unit.

In this embodiment of this application, in a delay measurement process, a moment may be indicated based on a part of bits of a frame number, so that signaling overheads can be reduced.

In this embodiment of this application, the second moment at which the first communications device receives the first data unit may be indicated based on the part of bits of the frame number. After obtaining the second moment, the second communications device may determine the delay from the second communications device to the first communications device based on the first moment and the second moment, thereby reducing signaling overheads.

With reference to the third aspect, in some possible implementations of the third aspect, the part of bits of the frame number includes last N bits of the frame number, and N is an integer greater than or equal to 1.

With reference to the third aspect, in some possible implementations of the third aspect, the first time information includes at least one of the following: the part of bits of the frame number corresponding to the second moment, a subframe number corresponding to the second moment, a slot sequence number corresponding to the second moment, or a symbol sequence number corresponding to the second moment.

With reference to the third aspect, in some possible implementations of the third aspect, the first time information corresponds to a first subcarrier spacing.

With reference to the third aspect, in some possible implementations of the third aspect, the first communications device is a terminal device, the second communications device is an access network device, and the method further includes: The second communications device receives second indication information sent by a core network device, where the second indication information is used to indicate a size of a data unit for which a delay needs to be measured, and the second communications device generates the first data unit based on the second indication information.

With reference to the third aspect, in some possible implementations of the third aspect, a header of the second data unit further includes second time information, the second time information is used to indicate a third moment at which the first communications device generates the second data unit, and the method further includes: The second communications device determines a second delay from the first communications device to the second communications device based on the third moment and a fourth moment, where the fourth moment is a moment at which the second communications device receives the second data unit.

According to a fourth aspect, a delay measurement method is provided. The method includes: A first communications device receives a first data unit from a second communications device; and the first communications device sends a second data unit to the second communications device, where the second data unit includes first time information, the first time information is used to indicate a second moment at which the first communications device receives the first data unit, and the first time information indicates the second moment based on a part of bits of a frame number.

With reference to the fourth aspect, in some possible implementations of the fourth aspect, the part of bits of the frame number includes last N bits of the frame number, and N is an integer greater than or equal to 1.

With reference to the fourth aspect, in some possible implementations of the fourth aspect, the first time information includes at least one of the following: the part of bits of the frame number corresponding to the second moment, a subframe number corresponding to the second moment, a slot sequence number corresponding to the second moment, or a symbol sequence number corresponding to the second moment.

With reference to the fourth aspect, in some possible implementations of the fourth aspect, the first time information corresponds to a first subcarrier spacing.

With reference to the fourth aspect, in some possible implementations of the fourth aspect, the second data unit further includes second time information, and the second time information is used to indicate a third moment at which the first communications device generates the second data unit.

With reference to the fourth aspect, in some possible implementations of the fourth aspect, the first communications device is a terminal device, and the second communications device is an access network device; or the first communications device is an access network device, and the second communications device is a terminal device.

According to a fifth aspect, a delay measurement apparatus is provided. The apparatus is a first communications device and includes: a communications interface, a memory that is configured to store instructions, and a processor that is connected to the memory and the communications interface and that is configured to execute the instructions stored in the memory, to perform the following steps when executing the instructions: receiving a data unit from a second communications device through the communications interface, where the data unit includes time information, the time information is used to indicate a first moment at which the second communications device sends the data unit, and the time information indicates the first moment based on a part of bits of a frame number; and determining a delay from the second communications device to the first communications device based on the first moment and a second moment, where the second moment is a moment at which the first communications device receives the data unit.

With reference to the fifth aspect, in some possible implementations of the fifth aspect, the part of bits of the frame number includes last N bits of the frame number, and N is an integer greater than or equal to 1.

With reference to the fifth aspect, in some possible implementations of the fifth aspect, the time information includes at least one of the following: the part of bits of the frame number corresponding to the first moment, a subframe number corresponding to the first moment, a slot sequence number corresponding to the first moment, or a symbol sequence number corresponding to the first moment.

With reference to the fifth aspect, in some possible implementations of the fifth aspect, the time information corresponds to a first subcarrier spacing.

With reference to the fifth aspect, in some possible implementations of the fifth aspect, the processor is further configured to send delay information to the second communications device through the communications interface, where the delay information includes the delay.

With reference to the fifth aspect, in some possible implementations of the fifth aspect, the first communications device is a terminal device, and the second communications device is an access network device.

According to a sixth aspect, a delay measurement apparatus is provided. The apparatus is a second communications device and includes: a communications interface, a memory that is configured to store instructions, and a processor that is connected to the memory and the communications interface and that is configured to execute the instructions stored in the memory, to perform the following steps when executing the instructions: sending a data unit to a first communications device through the communications interface, where the data unit includes time information, the time information is used to indicate a first moment at which the second communications device sends the data unit, and the time information indicates the first moment based on a part of bits of a frame number; and receiving delay information from the first communications device through the communications interface, where the delay information indicates a delay from the second communications device to the first communications device, the delay is determined based on the first moment and a second moment, and the second moment is a moment at which the first communications device receives the data unit.

With reference to the sixth aspect, in some possible implementations of the sixth aspect, the part of bits of the frame number includes last N bits of the frame number, and N is an integer greater than or equal to 1.

With reference to the sixth aspect, in some possible implementations of the sixth aspect, the time information includes at least one of the following: the part of bits of the frame number corresponding to the first moment, a subframe number corresponding to the first moment, a slot sequence number corresponding to the first moment, or a symbol sequence number corresponding to the first moment.

With reference to the sixth aspect, in some possible implementations of the sixth aspect, the time information corresponds to a first subcarrier spacing.

With reference to the sixth aspect, in some possible implementations of the sixth aspect, the first communications device is a terminal device, and the second communications device is an access network device.

According to a seventh aspect, this application provides a delay measurement apparatus. The apparatus has functions of implementing the method according to the first aspect or the fourth aspect. These functions may be implemented by hardware, or may be implemented by hardware executing corresponding software. The hardware or the software includes one or more units corresponding to the foregoing functions.

According to an eighth aspect, this application provides a delay measurement apparatus. The apparatus has functions of implementing the method according to the second aspect or the third aspect. These functions may be implemented by hardware, or may be implemented by hardware executing corresponding software. The hardware or the software includes one or more units corresponding to the foregoing functions.

According to a ninth aspect, a delay measurement apparatus is provided. The communications apparatus includes a memory, a communications interface, and a processor. The memory is configured to store a computer program or instructions. The processor is coupled to the memory and the communications interface. When the processor executes the computer program or the instructions, the communications apparatus is enabled to perform the method according to the third aspect.

According to a tenth aspect, a delay measurement apparatus is provided. The communications apparatus includes a memory, a communications interface, and a processor. The memory is configured to store a computer program or instructions. The processor is coupled to the memory and the communications interface. When the processor executes the computer program or the instructions, the communications apparatus is enabled to perform the method according to the fourth aspect.

According to an eleventh aspect, a computer program product is provided. The computer program product includes computer program code; and when the computer program code is run on a computer, the computer is enabled to perform the method according to the first aspect or the fourth aspect.

According to a twelfth aspect, a computer program product is provided. The computer program product includes computer program code; and when the computer program code is run on a computer, the computer is enabled to perform the method according to the second aspect or the third aspect.

According to a thirteenth aspect, this application provides a chip system. The chip system includes a processor, configured to implement the method according to the first aspect or the third aspect, for example, receive or process data and/or information in the method. In a possible design, the chip system further includes a memory. The memory is configured to store program instructions and/or data. The chip system may include a chip, or may include a chip and another discrete component.

According to a fourteenth aspect, this application provides a chip system. The chip system includes a processor, configured to implement the method according to the second aspect or the third aspect, for example, receive or process data and/or information in the method. In a possible design, the chip system further includes a memory. The memory is configured to store program instructions and/or data. The chip system may include a chip, or may include a chip and another discrete component.

According to a fifteenth aspect, this application provides a computer-readable storage medium. The computer-readable storage medium stores a computer program; and when the computer program is run, the method according to the first aspect or the fourth aspect is implemented.

According to a sixteenth aspect, this application provides a computer-readable storage medium. The computer-readable storage medium stores a computer program; and when the computer program is run, the method according to the second aspect or the third aspect is implemented.

DESCRIPTION OF EMBODIMENTS

Figure 1:
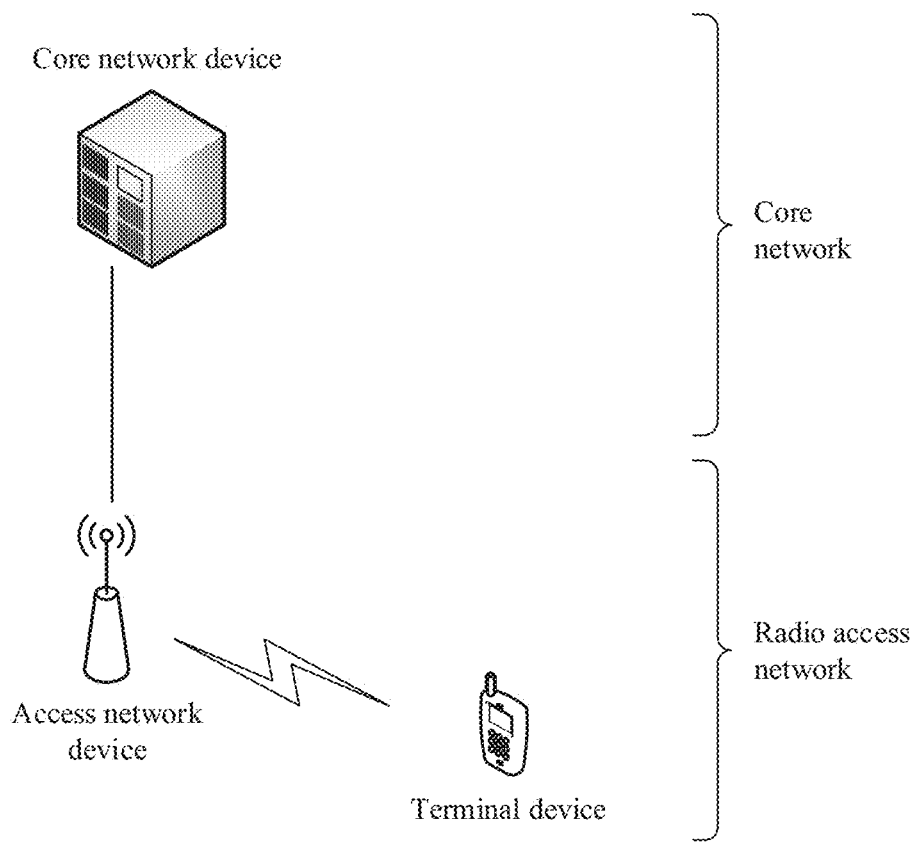
FIG. 1 is a schematic diagram of a possible application scenario according to an embodiment of this application.

The following describes technical solutions of this application with reference to the accompanying drawings.

The technical solutions in embodiments of this application may be applied to various communications systems, for example, a long term evolution (long term evolution, LTE) system, a 5th generation (5th generation, 5G) mobile communications system, a new radio (new radio, NR) communications system, a next generation (next generation, NG) communications system, and a future mobile communications system.

A terminal device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

An access network device in the embodiments of this application may be a device configured to communicate with the terminal device. The access network device may be a base transceiver station (base transceiver station, BTS) in a global system for mobile communications (global system for mobile communications. GSM) system or a code division multiple access (code division multiple access. CDMA) system, or may be a NodeB (NodeB, NB) in a wideband code division multiple access (wideband code division multiple access. WCDMA) system, or may be an evolved NodeB (evolved NodeB, eNB or eNodeB) in an LTE system, or may be a radio controller in a cloud radio access network (cloud radio access network, CRAN) scenario. Alternatively, the access network device may be a relay node, an access point, a vehicle-mounted device, a wearable device, an access network device in a future 5G network, an access network device in a future evolved PLMN network, or the like. This is not limited in the embodiments of this application.

In the embodiments of this application, the terminal device or the access network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). The operating system may be any one or more of computer operating systems implementing service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device or the access network device, or may be a functional module that is in the terminal device or the access network device and that can invoke and execute the program.

For ease of understanding, concepts in the embodiments of this application are first described. The concepts are merely intended to help understand examples in this application, and do not limit the embodiments of this application.

A radio resource control (radio resource control, RRC) layer is a protocol layer in a communications system, and is configured to perform broadcast, paging, RRC link establishment, radio bearer control, mobility, measurement and reporting control for the terminal device, and the like. A service data adaptation protocol (service data adaptation protocol. SDAP) layer is a new protocol layer introduced in 5G. and is responsible for mapping each quality of service (quality of service, QoS) flow (flow) sent by a core network or an application layer to a data resource bearer (data resource bearer, DRB) of a radio access layer, that is, based on a service attribute corresponding to the QoS flow, transmitting a data packet corresponding to the QoS flow on a corresponding DRB.

A packet data convergence protocol (packet data convergence protocol, PDCP) layer is a protocol layer in a communications system, and may perform a service such as security, header compression, or encryption. There may be a plurality of PDCP entities at the PDCP layer, and each entity carries data of one radio bearer (radio barrier, RB). The PDCP layer can be configured to ensure that data submitted to an upper layer is in order, that is, data is submitted in order.

A radio link control (radio link control, RLC) layer is a protocol layer in a communications system, and performs a service such as segmentation, reassembling, or retransmission. There may be a plurality of RLC entities at the RLC layer, and each RLC entity provides a service for each PDCP entity. The RLC layer can also be configured to ensure that data submitted to an upper layer is in order.

A media access control (media access control, MAC) layer is a protocol layer in a communications system and provides a data transmission service for a service on a logical channel, and performs a service such as scheduling or hybrid automatic repeat request (hybrid automatic repeat request, HARQ) acknowledgement and negative acknowledgement.

A physical (physical, PHY) layer performs coding and transmission on data delivered at the MAC layer.

Service data unit (service data unit, SDU) and protocol data unit (protocol data unit, PDU): For a user plane, protocol layers are an SDAP layer, a PDCP layer, an RLC layer, a MAC layer, and a PHY layer from top to bottom, or the protocol layers may not include an SDAP layer. For a control plane, protocol layers are an RRC layer, a PDCP layer, an RLC layer, a MAC layer, and a PHY layer from top to bottom. For each layer, data input from an upper layer is referred to as a SDU of this layer. Data obtained after processing at each layer is referred to as a PDU at this layer. For example, data input by a PDCP layer to an RLC layer is referred to as a PDCP PDU for the PDCP layer, and is referred to as an RLC SDU for the RLC layer.

FIG. 1 is a schematic diagram of a possible application scenario according to an embodiment of this application. As shown in FIG. 1, the application scenario may include a terminal device and an access network device. For specific descriptions of the terminal device and the access network device, refer to the foregoing related descriptions. In an example, the terminal device may be a mobile terminal, and the access network device may be a base station. As shown in FIG. 1, the terminal device may access a network through the access network device, and the terminal device and the access network device may communicate with each other over a radio link. Further, the access network device may be connected to a core network device. The core network device may include, for example, a core network control plane and a core network user plane. The core network control plane may be configured to be responsible for access and mobility management of the terminal device. The core network user plane may be configured to be responsible for functions such as data packet routing and forwarding and QoS management. The core network control plane may include, for example, an access and mobility management function (access and mobility management function, AMF). The core network user plane may include, for example, a user plane function (user plane function, UPF).

Figure 2:
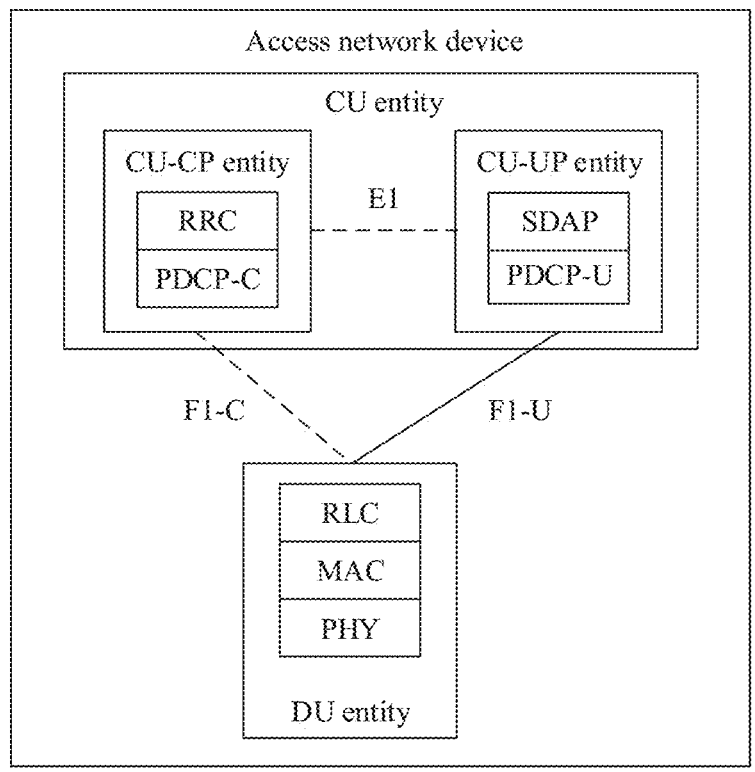
FIG. 2 is a schematic diagram of a protocol stack of an access network device having an architecture in which a CU entity and a DU entity are separated according to an embodiment of this application.

In a possible manner, the access network device may have an architecture in which a central unit (centralized unit, CU) entity and a distributed unit (distributed unit, DU) entity are separated. For example, FIG. 2 is a schematic diagram of a protocol stack of an access network device having an architecture in which a CU entity and a DU entity are separated according to an embodiment of this application. The CU and the DU may be understood as division of the access network device from a perspective of logical functions. The CU entity is an entity corresponding to a CU function, and the DU entity is an entity corresponding to a DU function. The CU entity and the DU entity may be physically separated, or may be deployed together. A plurality of DU entities may share one CU entity. One DU entity may also be connected to a plurality of CU entities (not shown in FIG. 2). The CU entity and the DU entity may be connected through an interface, for example, an F1 interface. The CU entity and the DU entity may be divided based on a protocol layer of a wireless network. For example, functions of an RRC protocol layer, an SDAP protocol layer, and a PDCP protocol layer are set in the CU entity, and functions of an RLC protocol layer, a MAC protocol layer, a PHY protocol layer, and the like are set in the DU entity. It may be understood that, division of processing functions of the CU entity and the DU entity based on the protocol layers is merely an example, and the processing functions of the CU entity and the DU entity may alternatively be divided in another manner. For example, the CU entity or the DU entity may be divided to have functions of more protocol layers. For example, the CU entity or the DU entity may alternatively be divided to have a part of processing functions of protocol layers. In a possible design, a part of functions of the RLC protocol layer and a function of a protocol layer above the RLC protocol layer are set in the CU entity, and a remaining function of the RLC protocol layer and a function of a protocol layer below the RLC protocol layer are set in the DU entity. In another possible design, functions of the CU entity or the DU entity may alternatively be divided based on a service type or another system requirement. For example, division is performed based on a delay. Functions whose processing time needs to satisfy a delay requirement are set in the DU entity, and functions that do not need to satisfy the delay requirement are set in the CU entity. In another possible design, the CU entity may alternatively have one or more functions of a core network. One or more CU entities may be disposed together, or may be disposed separately. For example, the CU entities may be disposed on a network side for centralized management. The DU entity may have a plurality of radio frequency functions, and the radio frequency functions may be remotely set.

Functions of the CU entity may be implemented by one function entity, or may be implemented by different function entities. For example, the functions of the CU entity may be further divided. For example, a control plane (control plane, CP) and a user plane (user plane. UP) are separated. To be specific, the CU entity includes a CU control plane (CU-CP) entity and a CU user plane (CU-UP) entity, and the CU-CP entity and the CU-UP entity may be coupled to the DU entity, to jointly implement a function of the access network device. In a possible manner, the CU-CP entity is responsible for a control plane function, and mainly includes an RRC protocol layer and a PDCP control plane (PDCP control plane. PDCP-C) protocol layer. The PDCP-C protocol layer is mainly responsible for data encryption and decryption, integrity protection, data transmission, and the like on the control plane. The CU-UP entity is responsible for a user plane function, and mainly includes an SDAP protocol layer and a PDCP user plane (PDCP user plane, PDCP-U) protocol layer. The SDAP protocol layer is mainly responsible for mapping a data flow (flow) of the core network to a bearer. The PDCP-U protocol layer is mainly responsible for encryption and decryption, integrity protection, header compression, serial number maintenance, data transmission, and the like on a data plane. In this embodiment of this application, the CU-CP entity is connected to the CU-UP entity through an E1 interface, the CU-CP entity is connected to the DU entity through an F1-C (control plane) interface, and the CU-UP entity is connected to the DU entity through an F1-U (user plane) interface. In addition, the CU-CP entity represents the access network device and the core network control plane (for example, a mobility management entity (mobility management entity. MME) of a 4th generation (4th generation, 4G) core network, or an access and mobility management function (access and mobility management function. AMF) network element of a 5G core network (5G core, 5GC)) that are connected. The CU-UP entity represents the access network device and the core network user plane (for example, a serving gateway (serving gateway, SGW) of a 4G core network, or a user plane function (user plane function, UPF) network element of a 5G core network) that are connected. The DU entity represents the access network device and the terminal device that are connected. Certainly, there is another possible implementation in which the PDCP-C is also in the CU-UP entity. This is not specifically limited in this embodiment of this application.

Figure 3:
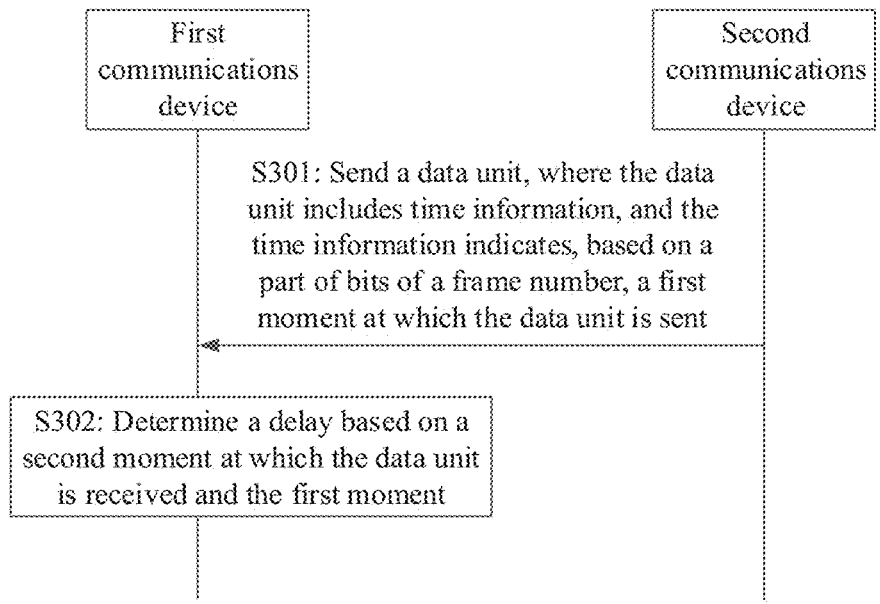
FIG. 3 is a schematic flowchart of a delay measurement method according to an embodiment of this application.

FIG. 3 is a schematic flowchart of a delay measurement method according to an embodiment of this application. The method in FIG. 3 may be performed by a first communications device and a second communications device. The first communications device and the second communications device may be any two devices in a communications network. For example, the first communications device may be a terminal device, and the second communications device may be an access network device. The method in FIG. 3 includes the following steps.

S301: The second communications device sends a data unit to the first communications device, and correspondingly, the first communications device receives the data unit from the second communications device, where the data unit includes time information, the time information is used to indicate a first moment at which the second communications device sends the data unit, and the time information may indicate the first moment based on a part of bits of a frame number.

Optionally, the data unit in this embodiment of this application may refer to a packet (packet), and the data unit may be a data packet, or may be a control packet. Alternatively, in this embodiment of this application, the data unit used for delay measurement may be referred to as a measurement packet, or may be referred to as a measurement PDU in some scenarios.

Optionally, that the data unit includes the time information may mean that the time information is carried in the data unit, or may be carried in a header of the data unit, or may be carried in a field after data carried in the data unit.

Optionally, the data unit may be for a protocol layer to which the time information is added. For example, if the time information is carried in a header of an SDAP layer, the data unit may be an SDAP PDU or an SDAP SDU. If the time information is carried in a header of a PDCP layer, the data unit may be a PDCP PDU or a PDCP SDU. Optionally, a new protocol layer may be defined. The protocol layer is responsible for a delay measurement function, and the data unit may be a PDU or an SDU of the newly defined protocol layer.

Optionally, a person skilled in the art can understand that the first moment may be any moment in a process from obtaining the data unit to sending the data unit by the second communications device, and the first moment may be determined in a plurality of manners.

In an implementation, if the data unit is received from an upper-layer protocol layer, the first moment may be a moment at which a current protocol layer receives the data unit from an upper layer. In this case, the data unit is an SDU of the current protocol layer. The current protocol layer is a protocol layer to which the time information is added. For example, assuming that the second communications device is the access network device, and the SDAP layer is a protocol layer to which the time information is added, the SDAP layer of the access network device may receive the data unit from a core network device, and may use a moment at which the SDAP layer receives the data unit as the first moment. In this case, the data unit is an SDU. For another example, assuming that the second communications device is the access network device, and the PDCP layer is a protocol layer to which the time information is added, the PDCP layer of the access network device may receive the data unit from the SDAP layer or a core network, and use a moment at which the data unit is received from the SDAP layer or the core network as the first moment. In this case, the data unit is an SDU.

In another implementation, the first moment may alternatively be a moment at which the current protocol layer generates the data unit. The current protocol layer may generate a PDU based on an SDU received from an upper layer, or may directly generate a PDU. In this case, the first moment may be the moment at which the current protocol layer generates the data unit. In this case, the data unit is the PDU. For example, the current protocol layer receives the SDU from an upper-layer protocol layer, adds a header to the SDU, and then generates the PDU.

In an example, if the data unit is the PDU, before the PDU is generated at the protocol layer of the second communications device, current time information may be recorded. The time information indicates a first moment of the PDU. Then, in a PDU generation process, the recorded time information may be carried in a header of the PDU.

Optionally, the first moment may also be determined in another manner. For example, the first moment may be any moment in a time periodicity from a time at which the current protocol layer receives the data unit to a time at which the current protocol layer sends the data unit to a lower layer, or may be any moment in a time periodicity from a time at which the current protocol layer generates the data unit to a time at which the current protocol layer sends the data unit to a lower layer.

The header (header) may be referred to as a packet header, and may be a special field added before a transmitted data packet at a protocol layer. A data packet can be identified by using the header, and information such as a type and a length of the packet can be recorded in the header.

Optionally, the frame number may be a frame number of a radio frame, or a frame number of a frame, or a frame number of a system frame. Optionally, that the time information indicates the first moment based on the part of bits of the frame number may mean that the time information includes the part of bits of the frame number instead of all bits of the frame number. The part of bits of the frame number may be used to indicate the first moment. The part of bits of the frame number may be, for example, last N bits of the frame number, where N is an integer greater than or equal to 1, and N is less than a quantity of all bits of the frame number. For example, N may be equal to 1, 2, 3, 4, 5, 6, 7, 8, 9, or another positive integer. In other words, the part of bits of the frame number may be low-order bits of the frame number. Because a time span experienced in a delay measurement process is relatively small, if different moments in the delay measurement process are indicated by using a frame number, high-order bits of the frame number may be the same. In other words, first M bits of the frame number may be the same, where M is a positive integer greater than or equal to 1, and M is less than a quantity of all bits of the frame number. For example, M may be equal to 1, 2, 3, 4, 5, 7, 8, 9, or another positive integer. Therefore, the high-order bits of the frame number do not need to be carried, and only the low-order bits of the frame number need to be carried to indicate the moment. The moment in the delay measurement process may be indicated based on the part of bits of the frame number. For example, the first moment, a second moment, a third moment, a fourth moment, and the like in this embodiment of this application may be indicated based on the part of bits of the frame number, so that signaling overheads can be reduced, and communication efficiency can be improved.

Optionally, a value of N may be pre-specified in a communications standard, or may be pre-agreed on by the first communications device and the second communications device. The first communications device and the second communications device may perform negotiation by using a control plane RRC message or a user plane. For example, the access network device may indicate the value of N to the terminal device by using an RRC message. Optionally, different service types may correspond to different values of N. The access network device may further indicate, to the terminal device, the values of N corresponding to different service types. Alternatively, the value of N may be indicated in the time information, or the value of N is carried in the data unit.

Optionally, the time information may alternatively include other information indicating the first moment. In other words, the part of bits of the frame number and the other information may jointly indicate the first moment. For example, the time information may include at least one of the following: the part of bits of the frame number corresponding to the first moment, a subframe number corresponding to the first moment, a slot sequence number corresponding to the first moment, or a symbol sequence number corresponding to the first moment. Similarly, in this embodiment of this application, the manner of indicating the first moment may alternatively be used to indicate another moment in the delay measurement process. Optionally, the first communications device and the second communications device may exchange an indication format of the time information. For example, the access network device may indicate, by using an RRC message, time units through which the terminal device indicates the time information. For example, the access network device may indicate that the time information is indicated by using one or more of the following time units: the part of bits of the frame number, the subframe number, the slot sequence number, and the symbol sequence number.

For example, in a communications system, from a perspective of a time domain resource, one frame usually includes a plurality of subframes, one subframe usually includes a plurality of slots, and one slot usually includes a plurality of symbols. For example, in an example, one radio frame may include 10 subframes, one frame may include two slots, and one slot includes seven symbols. A length of one radio frame may be 10 milliseconds (ms). The first moment may be indicated by using the part of bits of the frame number, the subframe number, the slot sequence number, and/or the symbol sequence number. A larger quantity of included time units and a smaller minimum time unit indicate higher precision of the indicated first moment. Similarly, the part of bits of the frame number, the subframe number, the slot sequence number, and/or the symbol sequence number may also be used to indicate another moment used for delay measurement in this embodiment of this application.

S302: The first communications device determines a delay from the second communications device to the first communications device based on the first moment and a second moment, where the second moment is a moment at which the first communications device receives the data unit.

The second moment may be for a protocol layer that carries the time information. That is, the second moment is a moment at which the first communications device receives the data unit at the protocol layer. In other words, that the first communications device receives the data unit may mean that the data unit is received at a peer protocol layer that generates the data unit. The first communications device can obtain the time information and determine the second moment at which the data unit is received only after parsing the data unit at the corresponding protocol layer. For example, if a protocol layer at which the header carrying the time information is located is the SDAP layer, the second moment may be a moment at which the SDAP layer of the first communications device receives the data unit. Alternatively, if a protocol layer at which the header carrying the time information is located is the PDCP layer, the second moment may be a moment at which the PDCP layer of the first communications device receives the data unit.

It takes a period of time for the protocol layer of the first communications device to receive the data unit, parse the data unit, and send the parsed data unit to a higher layer. Therefore, a person skilled in the art may understand that in specific practice, the second moment may be any moment in a time periodicity from a time at which the first communications device receives the data unit at the peer protocol layer to a time at which the first communications device transmits the data unit to the higher layer. This is not limited in this embodiment of this application.

The second moment may be determined in a plurality of manners. For example, in an implementation, the second moment may be a moment at which the first communications device submits the obtained SDU to the upper-layer protocol layer after the protocol layer that carries the time information parses the PDU of the data unit. For example, if the protocol layer that carries the time information is the SDAP layer, the data unit received by the SDAP layer of the first communications device is the SDAP PDU. The SDAP layer may parse the SDAP PDU to obtain the SDAP SDU and submit the SDAP SDU to the upper-layer protocol, for example, an application layer or a core network side. The second moment is a moment at which the SDAP SDU is submitted to the upper-layer protocol. For another example, if the protocol layer that carries the time information is the PDCP layer, the PDCP layer of the first communications device receives the PDCP PDU, parses the PDCP PDU to obtain the PDCP SDU, and then submits the PDCP SDU to the upper-layer protocol layer, for example, an application layer, an SDAP layer, or a core network side. The second moment is a moment at which the PDCP SDU is submitted to the upper-layer protocol layer.

In another implementation, the second moment may be a moment after the first communications device receives the data unit at the protocol layer that carries the time information, and obtains the time information from the corresponding PDU. For example, if the protocol layer at which the time information is carried is the SDAP layer, the data unit is the SDAP PDU. In this case, the second moment may be a moment after the first communications device receives the SDAP PDU at the SDAP layer, and extracts the time information from the SDAP PDU. Alternatively, if the protocol layer that carries the time information is the PDCP layer, the data unit is the PDCP PDU. In this case, the second moment may be a moment after the first communications device receives the PDCP PDU at the PDCP layer, and extracts the time information from the PDCP PDU.

Optionally, it takes a period of time for the protocol layer of the first communications device to receive the PDU, extract the corresponding SDU, and send the extracted SDU to a higher layer. Therefore, a person skilled in the art may understand that in specific practice, the second moment may alternatively be any moment in a time periodicity from a time at which the first communications device receives the PDU at the protocol layer that carries the time information to a time at which the first communications device transmits the SDU obtained through parsing to the higher layer. This is not limited in this embodiment of this application.

Optionally, the second moment may also be indicated in a same manner as the first moment. In other words, the second moment may also be indicated based on the part of bits of the frame number. Alternatively, the second moment may also be indicated in another manner, for example, indicated based on all bits of the frame number, or indicated based on a time stamp. This is not limited in this embodiment of this application.

The first communications device may determine, based on the first moment and the second moment, the delay for sending the data unit from the second communications device to the first communications device. For example, assuming that the first moment is T1, the second moment is T2, and the foregoing delay is Delay, Delay=T2−T1. It should be noted that the delay herein is a time difference between the second moment and the first moment, and is not necessarily a difference between indication forms used for the second moment and the first moment. For example, last N bits of the frame number indicate moment information. It is assumed that a value of the last N bits of the frame number at the moment T1 is N1, and a value of the last N bits of the frame number at the moment T2 is N2. If N1>N2, the time difference corresponding to the frame number is a time unit represented by (2^N−N1+N2)*1 frame. If N1≤N2, the time difference corresponding to the frame number is a time unit represented by (N2-N1)*1 frame. Assuming that N is 4 bits, N1 is 15, N2 is 1, and the time unit represented by 1 frame is 1 ms, the time difference based on the frame number between T1 and T2 is (2^4−15+1)*1 ms=2 ms. A similar method may also be used for other time differences based on the subframe number, the slot sequence number, and/or the symbol sequence number, and finally, a difference between T2 and T1 is a sum of the time differences corresponding to the frame number, the subframe number, the slot sequence number, and/or the symbol sequence number. This is not limited in this embodiment of this application.

It should be noted that, assuming that the first moment and the second moment that are obtained at a time are one sample, the delay may be obtained from one sample, or may be obtained from a plurality of samples. For example, the delay is obtained by obtaining an average value of a plurality of samples. Similarly, another delay in this embodiment of this application may also be obtained by using one or more samples. For example, a delay corresponding to a data unit is determined based on a first moment and a second moment of the data unit, or a delay between a first device and a second device may be determined based on a first moment and a second moment of a plurality of data units.

Optionally, in this application, when the first communications device and the second communications device send a first data unit, indication information may be further carried. The indication information is used to indicate whether a delay of the first data unit belongs to a feedback by using one sample or a feedback by using a plurality of samples.

Optionally, the first communications device may notify the second communications device of a delay measurement result obtained through measurement. For example, the first communications device may notify the second communications device through a control PDU of a protocol layer corresponding to the time information. The delay measurement result may carry some indication information, for example, carry an SN of a PDCP layer, to indicate a data unit corresponding to a delay measurement result that the measurement result is.

In this embodiment of this application, in a delay measurement process, a moment may be indicated based on a part of bits of a frame number, so that signaling overheads can be reduced.

In this embodiment of this application, the first moment at which the second communications device sends the data unit may be indicated based on the part of bits of the frame number, and the first communications device may determine the delay from the second communications device to the first communications device based on the second moment at which the data unit is received and the first moment, thereby reducing signaling overheads.

It should be noted that FIG. 3 is merely used as an example of the delay measurement method according to this embodiment of this application. A person skilled in the art can understand that a delay between communications devices may be measured in another manner. If the part of bits of the frame number are used to indicate a moment during delay measurement, the delay measurement method falls within the protection scope of this application.

Optionally, in a communications system, a physical layer may have different combinations of a system frame, a subframe, a slot, and a symbol, and different subcarrier spacings correspond to different cases. For example, the subcarrier spacing corresponds to a quantity of slots included in each subframe, or a quantity of symbols included in each slot. In other words, at different subcarrier spacings, the quantity of slots included in each subframe or the quantity of symbols included in each slot may be different. For example, the following Table 1 lists correspondences between different subcarrier spacings and quantities of slots and correspondences between different subcarrier spacings and quantities of symbols. It should be understood that Table 1 is merely used as an example. For a correspondence between a subcarrier spacing and a quantity of slots and a correspondence between a subcarrier spacing and a quantity of symbols, there may also be another example. This is not limited in this application. In Table 1, one frame may include 10 subframes. As listed in Table 1, at different subcarrier spacings, each subframe includes different quantities of slots, and each frame includes different quantities of slots.

TABLE 1

| Subcarrier spacing (kilohertz kHz) | Quantity of symbols included in each slot | Quantity of slots included in each frame | Quantity of slots included in each subframe |
| --- | --- | --- | --- |
| 15 | 14 | 10 | 1 |
| 30 | 14 | 20 | 2 |
| 60 | 14 | 40 | 4 |
| 120 | 14 | 80 | 8 |
| 240 | 14 | 160 | 16 |

For example, in Table 1, if the subcarrier spacing is 30 kHz, each subframe includes two slots; or if the subcarrier spacing is 60 kHz, each subframe includes four slots. Therefore, for different subcarrier spacings, time lengths corresponding to slots or symbols are different. In this embodiment of this application, the time information may correspond to a subcarrier spacing, to more accurately determine each moment used for delay measurement, and even if the subcarrier spacing changes in a data unit sending process, each moment used for delay measurement, for example, the first moment or the second moment, may be accurately determined based on a corresponding subcarrier spacing. In other words, a subcarrier spacing corresponding to the time information is decoupled from a subcarrier spacing used for sending the data unit. The subcarrier spacing corresponding to the time information may be pre-specified in a communications standard, or may be pre-agreed on by the first communications device and the second communications device (for example, negotiated by the first communications device and the second communications device by using a control plane RRC message or a user plane). Alternatively, the subcarrier spacing corresponding to the time information may be indicated in the time information. Similarly, in this embodiment of this application, another moment, for example, the second moment, for indicating delay measurement may also correspond to a subcarrier spacing. For example, the first moment is a slot number and a symbol number that correspond to a subcarrier spacing 1. When the first communications device receives the data unit, the corresponding subcarrier spacing changes to a subcarrier spacing 2. In this case, the first communications device needs to convert the slot number and the symbol number that correspond to the current subcarrier spacing 2 and the slot number and the symbol number that correspond to the subcarrier spacing 1 to slot numbers and symbol numbers at a same subcarrier spacing, and then calculates a corresponding delay.

It should be noted that the embodiment in which the time information corresponds to the subcarrier spacing is not limited to a case in which indication is performed based on the part of bits of the frame number. For example, the time information may alternatively be indicated based on all bits of the frame number. Alternatively, the time information may be indicated in another manner.

In an example, the time information may correspond to a first subcarrier spacing. The first subcarrier spacing may be, for example, any one of the following: a 15 kHz subcarrier spacing, a 30 kHz subcarrier spacing, a 60 kHz subcarrier spacing, a 120 kHz subcarrier spacing, or a 240 kHz subcarrier spacing.

Optionally, the first communications device may send delay information to the second communications device, and the delay information includes the delay. For example, if the first communications device is the terminal device, and the second communications device is the access network device, the terminal device may send a measured delay between the access network device and the terminal device to the access network device, so that the access network device performs data transmission or data scheduling based on the received delay. Optionally, the access network device may further send the delay information to the core network.

Figure 4:
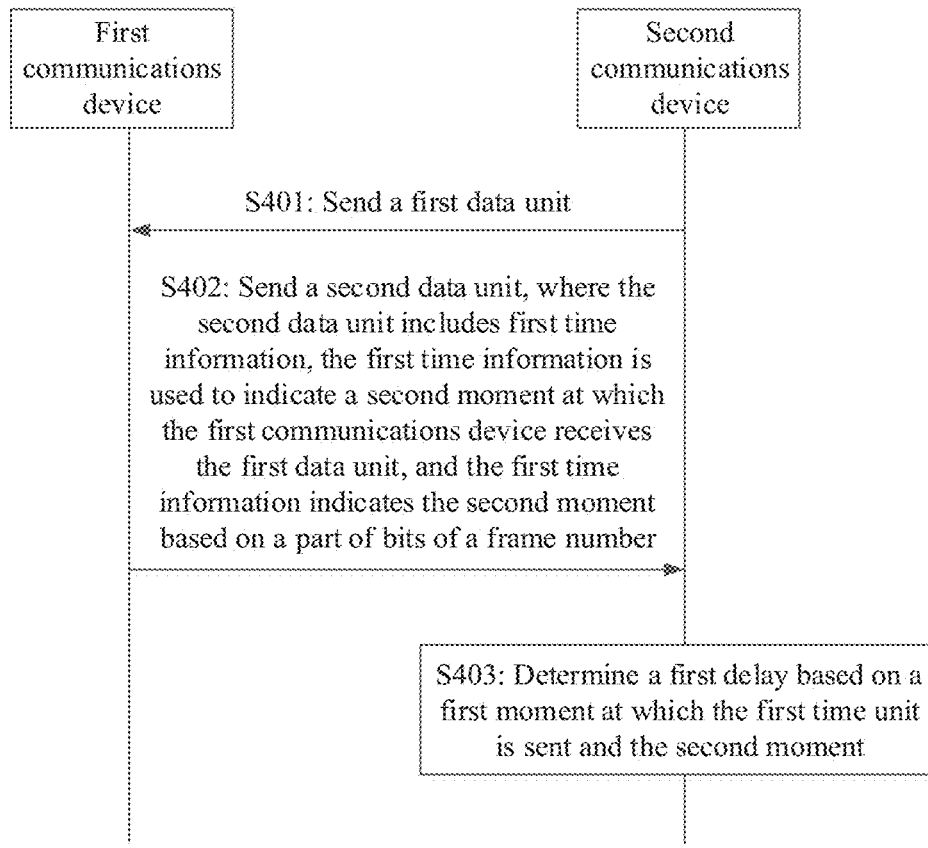
FIG. 4 is a schematic flowchart of a delay measurement method according to another embodiment of this application.

FIG. 4 is a schematic diagram of a delay measurement method according to another embodiment of this application. The method in FIG. 4 may be performed by a first communications device and a second communications device. The first communications device and the second communications device may be any two communications devices in a communications network. For example, the first communications device may be a terminal device, and the second communications device may be an access network device. As shown in FIG. 4, the method includes the following steps.

S401: The second communications device sends a first data unit to the first communications device, and correspondingly, the first communications device receives the first data unit from the second communications device.

Similar to the data unit in FIG. 3, the first data unit may be a data packet, or may be a control packet, or the data unit may be a PDU or an SDU corresponding to a protocol layer. For example, the first data unit may be a PDU or an SDU at an SDAP layer, or may be a PDU or an SDU at a PDCP layer.

Optionally, the second communications device may determine a first moment at which the first data unit is sent. Optionally, a manner of determining the first moment at which the first data unit is sent may be the same as or similar to the manner of determining the first moment at which the data unit is sent in FIG. 3. Details are not described herein again.

Optionally, the first data unit may include first indication information, and the first indication information is used to indicate that the first data unit is used for delay measurement, so that the first communications device records, based on the first indication information, a second moment at which the first communications device receives the first data unit. Alternatively, the first data unit may be a specific data unit. After receiving the specific data unit, the first communications device may record a second moment at which the first communications device receives the first data unit. For example, a type of the first data unit is the control packet. After receiving the control packet, the first communications device determines, according to a pre-agreement, that the control packet is used to perform delay measurement.

S402: The first communications device sends a second data unit to the second communications device, and correspondingly, the second communications device receives the second data unit from the first communications device, where the second data unit includes first time information, the first time information is used to indicate the second moment at which the first communications device receives the first data unit, and the first time information may indicate the second moment based on a part of bits of a frame number.

Optionally, that the second data unit includes the first time information may mean that the first time information is carried in the second data unit, or may be carried in a header of the second data unit, or may be carried in a field after data of the second data unit.

Optionally, the second moment is a moment at which the first communications device receives the first data unit. A manner of determining the second moment at which the first communications device receives the first data unit is the same as or similar to the manner of determining the second moment in FIG. 3. Details are not described herein again.

Optionally, the frame number may be a frame number of a radio frame, or a frame number of a frame, or a frame number of a system frame. Optionally, that the first time information indicates the second moment based on the part of bits of the frame number may mean that the first time information includes the part of bits of the frame number instead of all bits of the frame number. The part of bits of the frame number may be used to indicate the second moment. The part of bits of the frame number may be, for example, last N bits of the frame number, where N is an integer greater than or equal to 1, and N is less than a quantity of all bits of the frame number. For example, N may be equal to 1, 2, 3, 4, 5, 6, 7, 8, 9, or another positive integer. In other words, the part of bits of the frame number may be low-order bits of the frame number. Because a time span experienced in a delay measurement process is not large, if different moments in the delay measurement process are indicated by using the frame number, high-order bits of the frame number may be the same. In other words, first M bits of the frame number may be the same, where M is a positive integer greater than or equal to 1, and M is less than a quantity of all bits of the frame number. For example, M may be equal to 1, 2, 3, 4, 5, 6, 7, 8, 9, or another positive integer. Therefore, the high-order bits of the frame number do not need to be carried, and only the low-order bits of the frame number need to be carried to indicate the moment. The moment in the delay measurement process may be indicated based on the part of bits of the frame number. For example, the first moment, the second moment, and the like in this embodiment of this application may be indicated based on the part of bits of the frame number, so that signaling overheads can be reduced, and communication efficiency can be improved.

Optionally, the time information may alternatively include other information indicating the second moment. In other words, the part of bits of the frame number and the other information may jointly indicate the second moment. For example, the time information may include at least one of the following: the part of bits of the frame number corresponding to the second moment, a subframe number corresponding to the second moment, a slot sequence number corresponding to the second moment, or a symbol sequence number corresponding to the second moment.

S403: The second communications device determines a first delay from the second communications device to the first communications device based on the first moment and the second moment, where the first moment is a moment at which the second communications device generates the first data unit.

Optionally, after obtaining the second moment through the second data unit, the second communications device may determine the first delay from the second communications device to the first communications device based on the first moment and the second moment. Assuming that the first moment is T1, the second moment is T2, and the first delay is Delay 1, Delay 1=T2-T1. It should be noted that the first delay herein is a time difference between the second moment and the first moment, and is not necessarily a difference between indication forms used for the second moment and the first moment. For a specific method, refer to the example in FIG. 3.

Optionally, the header of the first data unit sent by the second communications device may further include information indicating the first moment, so that after receiving the first data unit, the first communications device may also determine the first delay from the second communications device to the first communications device based on the first moment and the second moment.

In this embodiment of this application, the second moment at which the first communications device receives the first data unit may be indicated based on the part of bits of the frame number. After obtaining the second moment, the second communications device may determine the delay from the second communications device to the first communications device based on the first moment and the second moment, thereby reducing signaling overheads.

Optionally, the first time information corresponds to a first subcarrier spacing. The first subcarrier spacing may be, for example, any one of the following: a 15 kHz subcarrier spacing, a 30 kHz subcarrier spacing, a 60 kHz subcarrier spacing, a 120 kHz subcarrier spacing, or a 240 kHz subcarrier spacing.

It can be learned from the foregoing descriptions of Table 1 that, in a communications system, a physical layer may have different combinations of a system frame, a subframe, a slot, and a symbol, and different subcarrier spacings correspond to different cases. For example, the subcarrier spacing corresponds to a quantity of slots included in each subframe, or a quantity of symbols included in each slot. In other words, at different subcarrier spacings, the quantity of slots included in each subframe or the quantity of symbols included in each slot may be different. Therefore, for different subcarrier spacings, time lengths corresponding to slots or symbols are different. In this embodiment of this application, the first time information may correspond to the subcarrier spacing, to more accurately determine each moment used for delay measurement, for example, the first moment or the second moment. The subcarrier spacing corresponding to the first time information may be pre-specified in a communications standard, or may be pre-agreed on by the first communications device and the second communications device. For example, the second communications device may send, to the first communications device, information indicating the subcarrier spacing corresponding to the first time information. For example, the subcarrier spacing corresponding to the first time information may be indicated in the first time information. Similarly, in this embodiment of this application, another moment, for example, a second moment, or second time information described below, for indicating delay measurement may also correspond to a subcarrier spacing.

It should be noted that, when the first time information corresponds to the first subcarrier spacing, the first time information is not limited to a case in which indication is performed based on the part of bits of the frame number. For example, the first time information may alternatively be indicated based on all bits of the frame number.

Optionally, if the first communications device is the terminal device, and the second communications device is the access network device, the second communications device may further receive the second indication information sent by a core network device. The second indication information is used to indicate a size of a data unit for which a delay needs to be measured. The second communications device may generate the first data unit based on the second indication information. For example, a size of the first data unit may be the same as or similar to the size indicated by the second indication information. For example, a core network control plane may indicate, to the access network device by using the second indication information, that a delay corresponding to a 100-byte data unit needs to be measured for a PDU session or a QoS flow of the terminal device. In this case, the access network may generate the first data unit, and the size of the first data unit is 100 bytes or an approximate size of the first data unit is 100 bytes.

In this embodiment of this application, delays that correspond to data units of different sizes and that are between the first communications device and the second communications device may be measured, so that data scheduling or data transmission can be performed in more detail, and communication efficiency is improved.

Optionally, in S402, the header of the second data unit may further include second time information, and the second time information is used to indicate a third moment at which the first communications device generates the second data unit. Optionally, the second communications device may determine a second delay from the first communications device to the second communications device based on the third moment and a fourth moment, where the fourth moment is a moment at which the second communications device receives the second data unit.

Definitions of the third moment and the fourth moment are similar to those of the first moment and the second moment. For details, refer to the foregoing related descriptions. Details are not described herein again.

In an example, assuming that the third moment is denoted as T3, the fourth moment is denoted as T4, and the second delay is denoted as Delay 2, Delay 2=T4−T3.

Further, the second communications device may further determine a third delay indicating a round-trip delay between the second communications device and the first communications device. Assuming that the third delay is denoted as Delay 3, Delay 3=T2−T1+T4−T3.

Optionally, the second communications device may further determine the second delay and the third delay based on the second moment and the fourth moment, that is, Delay 2=T4−T2, and Delay 3=T4−T1. Optionally, the second moment and the third moment may be a same moment.

It should be noted that the foregoing delays refer to time differences between moments, and are not necessarily differences between indication forms used for the moments. For a specific method, refer to the example in FIG. 3.

In this embodiment of this application, the header of the second data unit sent by the first communications device to the second communications device may include both information indicating the second moment and information indicating the third moment, so that the second communications device determines, based on the foregoing information, the first delay from the second communications device to the first communications device, and the second delay from the first communications device to the second communications device, or may further determine the third delay indicating the round-trip delay between the second communications device and the first communications device, thereby improving delay measurement efficiency.

Optionally, there may be a plurality of manners of triggering delay measurement in this application. For example, the core network control plane may trigger the delay measurement, or a network management center may trigger the delay measurement. Alternatively, the delay measurement may be periodically triggered. If the delay measurement is periodically performed, the access network device may periodically generate a measurement packet to be sent to the terminal device. Alternatively, the access network device may trigger the delay measurement on the terminal device. For example, when the access network device detects that a signal of a terminal device deteriorates, the access network device may trigger delay measurement on the terminal device.

In addition, the access network device may receive some delay measurement configuration information, for example, information indicating that a QoS flow (flow), a data resource bearer (data resource bearer, DRB), or a PDU session (session) needs to perform delay measurement, sent by the core network control plane. Optionally, an RRC configuration message sent by the access network device to the terminal device is used to notify that delay measurement needs to be performed on a QoS flow, a DRB, or a PDU session. Alternatively, the delay measurement configuration information may indicate a size of a delay measurement packet corresponding to the QoS flow, the DRB, or the PDU session.

Optionally, in a CU-UP/CU-CP architecture, after a CU-CP receives the delay measurement configuration information of the core network control plane, the CU-CP may notify a CU-UP of the delay measurement configuration information. Alternatively, when the CU-UP receives measurement configuration information sent by another entity or the CU-UP triggers delay measurement, the CU-CP may notify the CU-UP of the delay measurement configuration information. The CU-CP may further notify the CU-UP of a subcarrier spacing corresponding to time information.

In a CU-DU architecture, to enable a CU to obtain, in wireless communication, a frame number, a subframe number, a slot number, and a symbol corresponding to a DU, the CU and the DU may exchange a correspondence between a frame number, a subframe number, a slot, a symbol, and an absolute time. For example, the DU may notify the CU of a start time of a combination of a frame number, a subframe number, a slot number, and a symbol corresponding to an absolute time. The combination herein may include one of a frame number, a subframe number, a slot number, and a symbol, for example, a frame number, or may include a plurality of a frame number, a subframe number, a slot number, and a symbol, for example, a frame number and a subframe number. In addition, the CU and the DU may further exchange a subcarrier spacing configuration corresponding to time information. For example, the CU notifies the DU of the used subcarrier spacing, so that the DU determines a subcarrier spacing corresponding to a combination of a frame number, a subframe number, a slot number, and a symbol, that corresponds to an absolute time and that is indicated to the CU. Optionally, the foregoing information may be exchanged between the CU-UP and the DU, or the foregoing information may be exchanged between the CU-CP and the DU, and then the CU-CP notifies the CU-UP of the foregoing information.

Optionally, in this application, when the data unit used for delay measurement is sent between the first communications device and the second communications device, for example, the data unit in FIG. 3 is sent or the first data unit and the second data unit in FIG. 4 are sent, one piece of indication information may be further carried. The indication information is used to indicate a delay measurement triggering reason, for example, whether the core network control plane triggers the delay measurement or the network management center triggers the delay measurement. When the first communications device feeds back a delay measurement result to the second communications device, the indication information may be further carried, to indicate the delay measurement triggering reason corresponding to the measurement result.

In addition, in a handover scenario, after receiving the delay measurement configuration information and other information related to delay measurement that are sent by the core network, a source access network device may forward the configuration information to a target access network device, so that the delay measurement is performed between the target access network device and the terminal device. For example, a source base station may send a message carrying the delay measurement configuration information to a target base station. For example, the message may include indication information to indicate whether delay measurement needs to be performed on a QoS flow, a DRB, or a PDU session, and indicate a corresponding size of a delay measurement packet or a corresponding delay measurement periodicity.

In the handover scenario, the configuration information may be directly sent by the source access network device to the target access network device, for example, carried in a handover request message. Alternatively, the configuration information may be sent by the core network to the target access network device. For example, a request requirement message sent by the source access network device to the core network carries the configuration information, and then the core network device includes the configuration information in a handover request message sent to the target base station. Correspondingly, the target access network device may send a response message to the source access network device. For example, the response message may indicate a QoS flow, a DRB, or a PDU session whose delay measurement is accepted, or indicate a QoS flow, a DRB, or a PDU session whose delay measurement is rejected.

In addition, in a dual connectivity scenario, after receiving the delay measurement configuration information sent by the core network, a primary base station may also send the delay measurement configuration information to a secondary base station. For example, the configuration information may be carried in a secondary base station addition request message or a secondary base station modification request message, or may be carried in a message of another type.

In an example, the access network device may receive delay measurement request information sent by the core network device, and correspondingly, the core network device sends the delay measurement request information to the access network device. The delay measurement request information is used to indicate to measure the delay between the access network device and the terminal device, and the delay measurement request information may be carried in a packet data unit (packet data unit, PDU) session (session) establishment message. The delay measurement request information may indicate to perform the delay measurement on the PDU session or the QoS flow of the terminal device. The delay measurement request information may include, for example, an identifier of the terminal device, a PDU session identifier, or a QoS flow identifier. Optionally, if the delay measurement is periodic, the delay measurement request information may further include a measurement periodicity of the delay measurement. For example, the second indication information may also be carried in the delay measurement request information.

Optionally, because delay measurement needs to be performed for some services, while delay measurement does not need to be performed for some other services, a service packet corresponding to a service that needs delay measurement may carry corresponding delay measurement indication information, and a service packet that does not need delay measurement does not need to carry corresponding delay measurement indication information. To reduce complexity of a receive end, the receive end does not need to detect whether each packet carries delay measurement indication information, and a transmit end may notify the receive end whether the delay measurement needs to be performed for a corresponding service. For example, the access network device notifies, by using an RRC message, the terminal device of services for which delay measurement needs to be performed and services for which delay measurement does not need to be performed. Further, whether delay measurement needs to be performed on a DRB may be indicated.

Optionally, in this embodiment of this application, headers of the data unit, the first data unit, and the second data unit may be in a plurality of formats. For example, a format of an existing header or a format of a newly defined header may be used. Optionally, if the first communications device and the second communications device are the terminal device and the access network device respectively, the access network device may send one piece of indication information to the terminal device, and the indication information may be used to indicate that the format of the newly defined header or the format of the existing header is used. The indication information may be a direct indication, or may be an implicit indication.

Optionally, the header of the first data unit may further include serial number information. The serial number information may be a measurement sequence number (measurement sequence number, M_SN). Alternatively, the serial number information may be a response sequence number (response sequence number, R_SN) of a response packet corresponding to the measurement packet. Optionally, the M_SN and the R_SN may be the same. The M_SN or R_SN may be a sequence number delivered by a core network (core network sequence number, CN_SN). For example, optionally, the serial number information may further include a sequence number generated by an SDAP layer or a sequence number generated by a PDCP layer.

Optionally, if the first communications device is the terminal device, and the second communications device is the access network device, the serial number information may be indicated by the core network device to the access network device.

Figure 5:
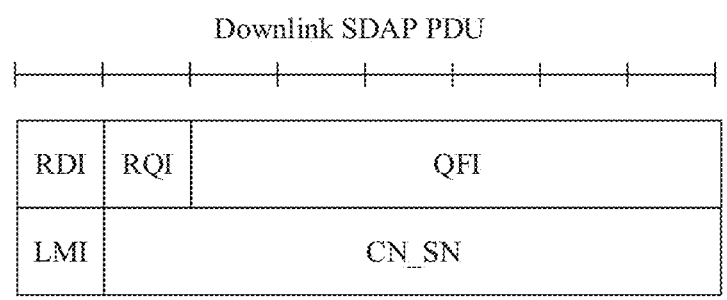
FIG. 5 is a schematic diagram of a format of a downlink service data adaptation protocol (service data adaptation protocol, SDAP) header according to an embodiment of this application.

FIG. 5 is a schematic diagram of a format of a downlink SDAP layer header defined in an embodiment of this application. As shown in FIG. 5, the format of the header may include a latency measurement indication (latency measurement indication, LMI), a reflective quality of service flow to DRB mapping indication (reflective QoS flow to DRB mapping indication, RDI), a reflective quality of service indication (reflective QoS indication, RQI), a quality of service flow identifier (QoS flow identifier, QFI), and core network sequence number (core network sequence number, CN-SN). The LMI indicates that a PDU corresponding to the header is used for delay measurement. The CN-SN indicates the sequence number delivered by the core network. The RDI indicates that the terminal may apply a downlink mapping relationship between a quality of service flow and a DRB to an uplink mapping relationship between a quality of service flow and a DRB. The RQI refers to applying a corresponding downlink quality of service flow identifier of a type of packet to a corresponding uplink quality of service flow identifier of this type of packet.

Optionally, for a format of an existing SDAP header, the LMI may not be added. Instead, a function corresponding to the RDI or the RQI may be restricted from being used, and a bit corresponding to the RDI or the RQI may be used to indicate content of the LMI.

In addition, if the time information corresponding to the data unit used for delay measurement is added at the SDAP layer, and because in some scenarios, the header of the SDAP layer may not carry information such as a measurement indication or a sequence number, for example, an LMI and a CN-SN, the SDAP layer may be configured with headers of different sizes. However, if header compression and encryption functions are configured at the PDCP layer, a header of a certain size of an SDAP PDU is always deducted at the PDCP layer before the header compression and encryption functions are performed. If not all headers of the SDAP PDUs carry measurement indications, serial numbers, and the like, SDAP PDUs of two header sizes may exist. For example, one is a 1-byte header, and the other is a header of more than 1 byte. In this case, the PDCP layer cannot learn of a quantity of bytes that are deducted, and the receive end cannot learn of a location from which the header compression decoding and decryption functions are performed either. To resolve this problem, when generating the PDU, the SDAP layer needs to notify the PDCP layer of a type of the PDU, and the PDCP layer needs to use some bit information in a PDCP header of the data unit to indicate the type of the data unit. For example, 1 bit (bit) is used to indicate a header size of an SDAP PDU included in the PDCP PDU.

Figure 6:
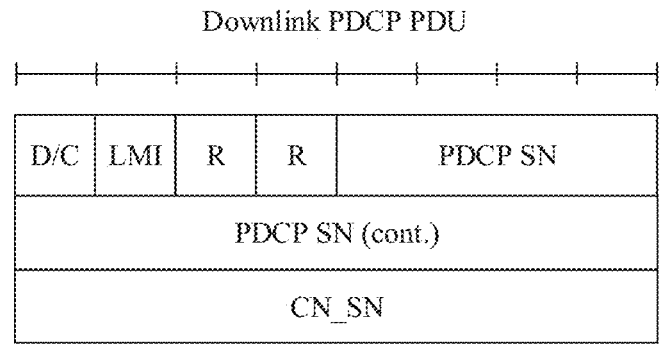
FIG. 6 is a schematic diagram of a format of a downlink packet data convergence protocol (packet data convergence protocol, PDCP) header according to an embodiment of this application.
Figure 7:
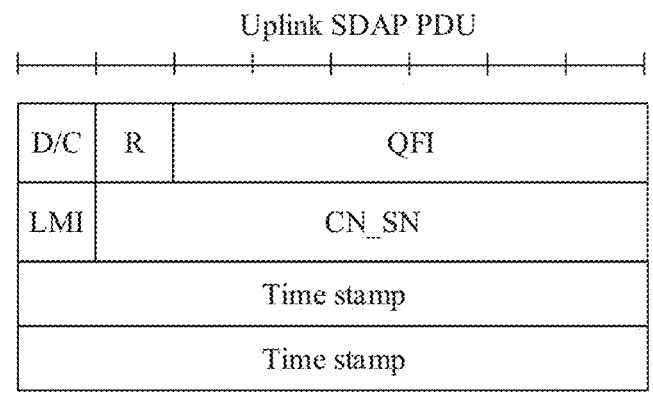
FIG. 7 is a schematic diagram of a format of an uplink SDAP header according to an embodiment of this application.

FIG. 6 is a schematic diagram of a format of a downlink PDCP layer header defined in an embodiment of this application. As shown in FIG. 6, the format of the header includes D/C, an LMI, a reserved bit R, a PDCP sequence number (PDCP serial number, PDCP SN), and a CN-SN. The D/C is used to indicate that a PDU corresponding to the header is a data packet or a control packet, the LMI is used to indicate that the PDU corresponding to the header is used for delay measurement, and the PDCP SN is used to indicate an SN of the packet at a PDCP layer. Because one PDCP SN may include a plurality of bytes, there is a PDCP SN (cont.). FIG. 7 is a schematic diagram of a format of a header of an uplink SDAP PDU defined in an embodiment of this application. As shown in FIG. 7, the format of the header includes D/C, a reserved bit R, a QFI, an LMI, a CN_SN, and a time stamp (time stamp). The D/C is used to indicate that a PDU corresponding to the header is a data packet or a control packet, and the LMI is used to indicate that the PDU corresponding to the header is used for delay measurement.

Figure 8:
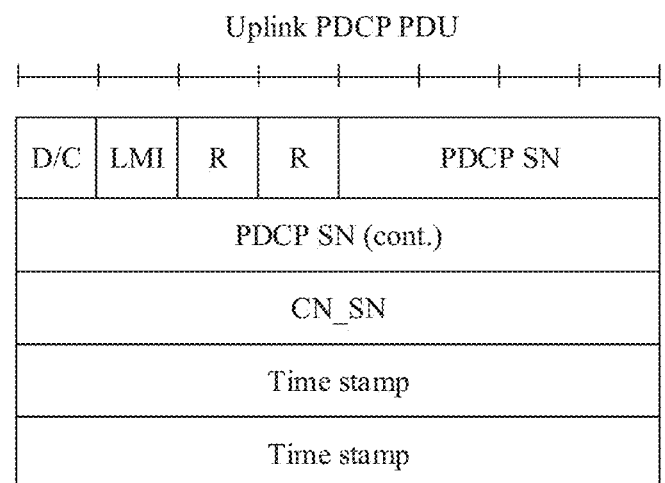
FIG. 8 is a schematic diagram of a format of an uplink PDCP header according to an embodiment of this application.

FIG. 8 is a schematic diagram of a format of an uplink SDAP PDU header defined in an embodiment of this application. As shown in FIG. 8, the format of the header includes D/C, an LMI, a reserved bit R, a PDCP SN, a CN_SN, a time stamp, and the like. The D/C is used to indicate that a PDU corresponding to the header is a data packet or a control packet, and the LMI is used to indicate that the PDU corresponding to the header is used for delay measurement.

Optionally, for a format of an existing SDAP header or a format of an existing PDCP header, the LMI may not be added, but the reserved bit R is used to indicate content of the LMI.

Figure 9:
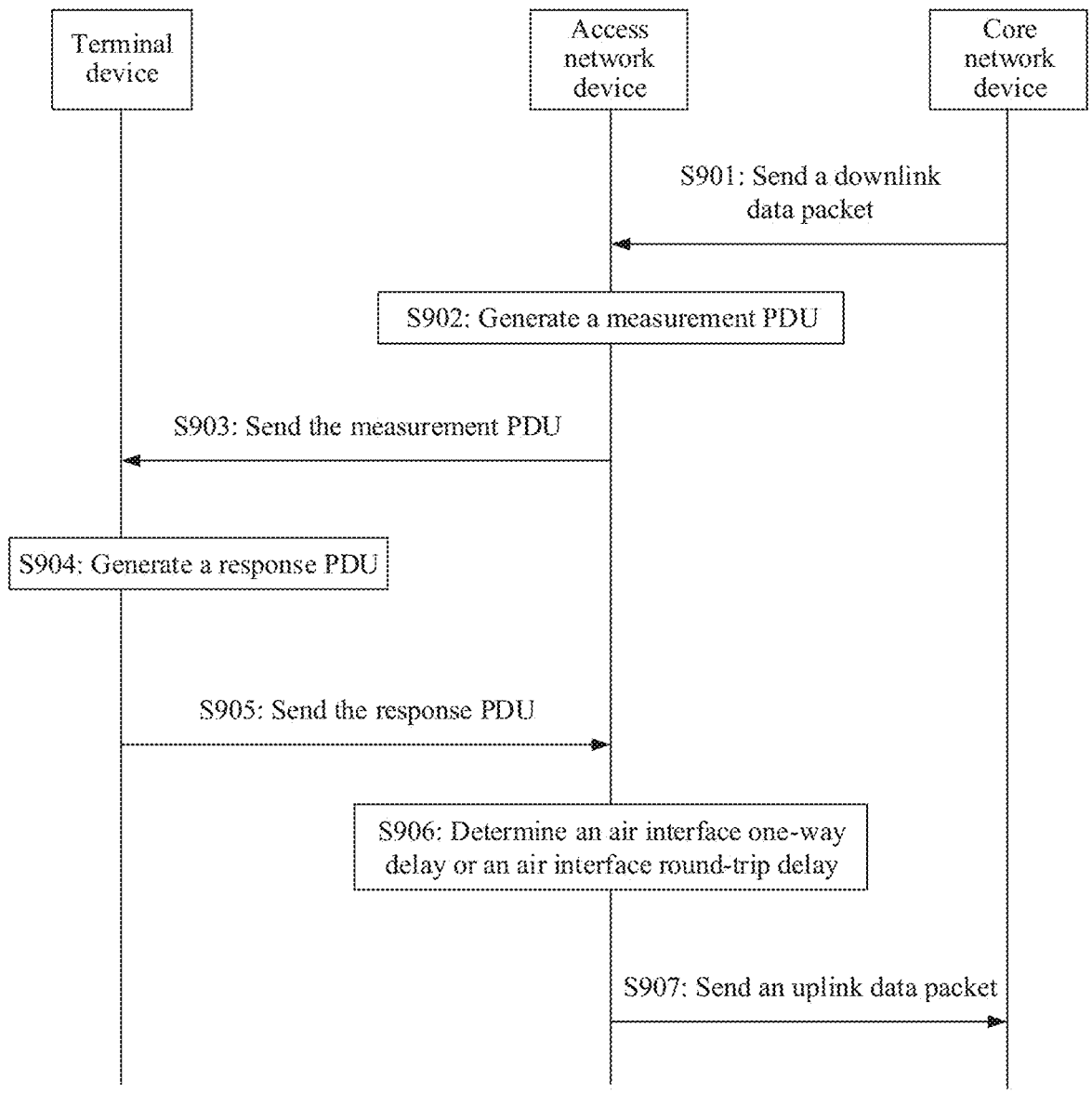
FIG. 9 is a schematic flowchart of a delay measurement method according to another embodiment of this application.

With reference to FIG. 9, the following describes a delay measurement method in an embodiment of this application. The first communications device may be a terminal device, and the second communications device may be an access network device. It should be noted that the method in FIG. 9 is merely used as an example. In practice, a manner of more or fewer steps than those in FIG. 9 may be used. This is not limited in this application. The first communications device may be the terminal device in FIG. 9, and the second communications device may be the access network device in FIG. 9. The method in FIG. 9 includes the following steps.

S901. A core network device sends a downlink data packet to the access network device, and correspondingly, the access network device receives the downlink data packet from the core network device.

Optionally, the downlink data packet may carry indication information indicating that the downlink data packet is a measurement packet. Optionally, the downlink data packet may further include serial number information, that is, a serial number of the measurement packet, for example, may be an M_SN or an R_SN. Optionally, the M_SN and the R_SN may be the same.

Optionally, the access network device may receive the downlink data packet from the core network device through a general packet radio service tunneling protocol-user plane (general packet radio service tunneling protocol user plane, GTP-U) tunnel. The indication information and the serial number information may be carried in a GTP-U header (header), or may be carried in an extension header.

Optionally, the downlink data packet may not carry data, or may carry data of an application layer.

Optionally, a core network user plane, for example, a UPF, may send the downlink data packets to the access network device. Before step S901, the core network control plane may indicate the access network device to initiate delay measurement on some services of the terminal. For example, the core network control plane may send delay measurement request information to the access network device, and the delay measurement request information is used to indicate to measure a delay corresponding to a PDU session or a QoS flow of a terminal device. For example, the delay measurement request information may be carried in a PDU session message, for example, a PDU session establishment message.

Optionally, the core network device may record a fifth moment at which the downlink data packet is sent.

S902: The access network device generates a measurement PDU.

Optionally, after receiving the downlink data packet, the access network device may determine that the downlink data packet is a packet indicating delay measurement, and the access network device may trigger the delay measurement. Specifically, the access network device may generate a measurement PDU based on the downlink data packet, and determine a first moment at which the measurement PDU is sent. For a manner of determining the first moment, refer to related descriptions in FIG. 3. For example, a moment at which the downlink data packet is received from an upper-layer protocol layer or a moment at which the measurement PDU is generated may be determined as the first moment. For example, the access network device may generate the measurement PDU at an SDAP layer or a PDCP layer. Optionally, the measurement PDU may carry serial number information. The serial number information may include, for example, at least one of the following: an M_SN, an R_SN, a sequence number generated by the SDAP layer, or a sequence number generated by the PDCP layer. The measurement PDU may further carry measurement indication information, to indicate to perform the delay measurement.

Optionally, the access network device may record the first moment at which the PDU is generated. The time information may indicate the first moment by using a format of a frame number, a subframe number, a slot, and a symbol in wireless communication. Only a part of the foregoing time units may be included to indicate the first moment. For example, the frame number, the subframe number, and the symbol are used to indicate the first moment.

Optionally, the measurement PDU may carry time information indicating the first moment, or may not carry time information indicating the first moment. If the time information indicating the first moment is carried, for a representation form of the frame number, only a part of bits of the frame number may be used for indication, to achieve an objective of reducing signaling overheads. For example, only low-order bits of the current frame number may be carried.

In addition, because a subcarrier spacing in a communications system may change, different subcarrier spacings correspond to different slot lengths and symbol lengths. Therefore, the access network device and the terminal device may use, by using a subcarrier spacing that is pre-agreed on or indicated in advance as a reference, a format of time information corresponding to the subcarrier spacing.

S903: The access network device sends the measurement PDU to the terminal device, and correspondingly, the terminal device receives the measurement PDU.

For example, the measurement PDU may be received by a wireless side of the terminal device. The wireless side of the terminal device may be a PDCP layer or an SDAP layer of the terminal device. After receiving the measurement PDU, the PDCP layer or the SDAP layer of the terminal device records a second moment at which the measurement PDU is received. For a manner of determining the second moment, refer to related descriptions in FIG. 3. For example, if the measurement PDU is an SDAP PDU, the second moment may be a moment at which the SDAP layer of the terminal device receives the measurement PDU, or may be a moment at which the SDAP layer parses the measurement PDU to obtain an SDU and submits the SDU to an upper layer.

Optionally, the terminal device may further record the serial number information corresponding to the measurement PDU, for example, may record a sequence number delivered by a core network. The sequence number delivered by the core network may include, for example, an S_SN or an R_SN.

S904: The terminal device generates a response PDU, where the response PDU carries first time information, and the first time information is used to indicate the second moment at which the terminal device receives the measurement PDU.

Optionally, the response PDU may further carry second time information, and the second time information is used to indicate a third moment at which the terminal device generates the response PDU.

Optionally, the first time information and the second time information may also be represented in a manner that is the same as or similar to that of the first moment. Details are not described herein again.

In an example, after receiving the measurement PDU, the terminal device may generate the response PDU at a peer protocol layer. The response PDU includes the first time information, and the first time information is used to indicate the second moment at which the terminal device receives the measurement PDU. The first time information may directly indicate the second moment, or may indirectly indicate the second moment, for example, indicate a difference between the second moment and the first moment.

In an example, the peer protocol layer in the terminal device may record the serial number information in the measurement PDU, and submit the measurement indication information and the M_SN or the R_SN that are carried in the measurement PDU to an upper-layer protocol layer. After the peer protocol layer receives the indication information carrying the M_SN or the R_SN from the upper-layer protocol layer, the peer protocol layer in the terminal device generates the response PDU. Optionally, the response PDU carries a corresponding M_SN or R_SN.

S905: The terminal device sends the response PDU to the access network device, and correspondingly, the access network device receives the response PDU.

Optionally, the access network device may record a fourth moment at which the response PDU is received. That the access network device receives the response PDU means that the access network device receives the response PDU at the peer protocol layer.

S906: The access network device determines an air interface one-way delay or an air interface round-trip delay.

The air interface one-way delay may be a first delay from the access network device to the terminal device, may be a second delay from the terminal device to the access network device, or may be a third delay indicating a round-trip delay between the access network device and the terminal device.

Optionally, the access network device has determined the first moment, the second moment, the third moment, and the fourth moment. The access network device may determine the foregoing delays based on the foregoing information. For example, it is assumed that the first moment to the fourth moment are respectively denoted as T1, T2, T3, and T4, and the first delay to the third delay are respectively denoted as Delay 1, Delay 2, and Delay 3. In this case, the delays may be denoted as follows:

the delay from the access network device to the terminal device: Delay 1=T2−T1;

the delay from the terminal device to the access network device Delay 2=T4−T3; and the delay between the access network device and the terminal device is: Delay 3=T2−T1+T4−T3.

Optionally, T2 and T3 may be a same moment.

It should be noted that the foregoing delays refer to time differences between moments, and are not necessarily differences between indication forms used for the moments. For a specific method, refer to the example in FIG. 3.

S907: The access network device sends an uplink data packet to the core network device, and correspondingly, the core network device receives the uplink data packet.

Optionally, after receiving the downlink data packet sent by the core network device in S901, the access network device may immediately send the uplink data packet to the core network, and the uplink data packet may carry response indication information. The uplink data packet may further carry at least one of the M_SN and the R_SN. After receiving the uplink data packet, the core network device may record a sixth moment at which the uplink data packet is received. In this way, the core network device may also obtain a round-trip delay between the core network device and the access network device. Assuming that the fifth moment is denoted as T5, the sixth moment is denoted as T6, and the round-trip delay is denoted as Delay 4, Delay 4=T6−T5. The core network may further calculate that a one-way delay between the core network and the access network device is (T6−T5)/2.

Optionally, the uplink data packet may further carry a delay that is between the terminal device and the access network device and that is previously measured by the access network device, for example, a delay from the terminal device to the access network device, a delay from the access network device to the terminal device, or a round-trip delay between the access network device and the terminal device.

Optionally, the uplink data packet sent by the access network device to the core network device may carry at least one of the delay from the access network device to the terminal device, the delay from the terminal device to the access network device, and the round-trip delay between the access network device and the terminal device that are calculated by the access network device, and may further carry the M_SN or the R_SN.

In this embodiment of this application, the part of bits of the frame number are used to indicate the time information, thereby reducing signaling overheads. In addition, a round-trip delay between communications devices can be measured, and measurement can be performed for data packets of different sizes, thereby improving delay measurement efficiency.

The foregoing describes the communication methods in the embodiments of this application with reference to FIG.

1 to FIG. 9. The following describes apparatuses in the embodiments of this application with reference to FIG. 10 to FIG. 15.

Figure 10:
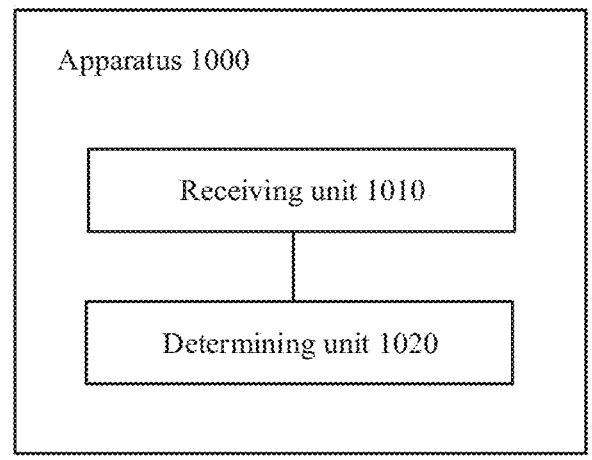
FIG. 10 is a schematic structural diagram of an apparatus according to an embodiment of this application.

FIG. 10 is a schematic block diagram of an apparatus 1000 according to an embodiment of this application. The apparatus 1000 may be a first communications device, and can perform the steps performed by the first communications device in the method embodiments of this application. To avoid repetition, details are not described herein again. The apparatus 1000 includes a receiving unit 1010 and a determining unit 1020.

The receiving unit 1010 is configured to receive a data unit from a second communications device, where the data unit includes time information, the time information is used to indicate a first moment at which the second communications device sends the data unit, and the time information indicates the first moment based on a part of bits of a frame number.

The determining unit 1020 is configured to determine a delay from the second communications device to the first communications device based on the first moment and a second moment, where the second moment is a moment at which the first communications device receives the data unit.

Figure 11:
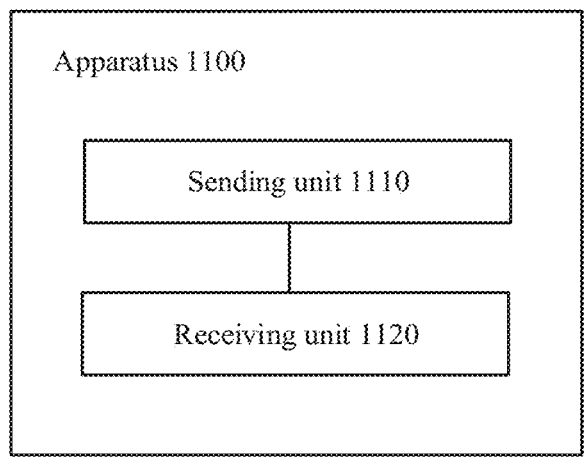
FIG. 11 is a schematic structural diagram of an apparatus according to another embodiment of this application.

FIG. 11 is a schematic block diagram of an apparatus 1100 according to an embodiment of this application. The apparatus 1100 may be a second communications device, and can perform the steps performed by the second communications device in the method embodiments of this application. To avoid repetition, details are not described herein again. The apparatus 1100 includes a sending unit 1110 and a receiving unit 1120.

The sending unit 1110 is configured to send a data unit to a first communications device, where the data unit includes time information, the time information is used to indicate a first moment at which the second communications device sends the data unit, and the time information indicates the first moment based on a part of bits of a frame number.

The receiving unit 1120 is configured to receive delay information from the first communications device, where the delay information indicates a delay from the second communications device to the first communications device, the delay is determined based on the first moment and a second moment, and the second moment is a moment at which the first communications device receives the data unit.

Figure 12:
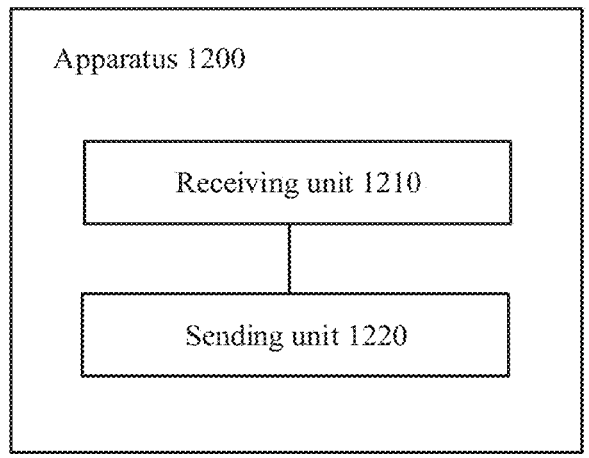
FIG. 12 is a schematic structural diagram of an apparatus according to another embodiment of this application.

FIG. 12 is a schematic block diagram of an apparatus 1200 according to an embodiment of this application. The apparatus 1200 may be a first communications device, and can perform the steps performed by the first communications device in the method embodiments of this application. To avoid repetition, details are not described herein again. The apparatus 1200 includes a receiving unit 1210 and a sending unit 1220.

The receiving unit 1210 is configured to receive a first data unit from a second communications device.

The sending unit 1220 is configured to send a second data unit to the second communications device, where the second data unit includes first time information, the first time information is used to indicate a second moment at which the first communications device receives the first data unit, and the first time information indicates the second moment based on a part of bits of a frame number.

Figure 13:
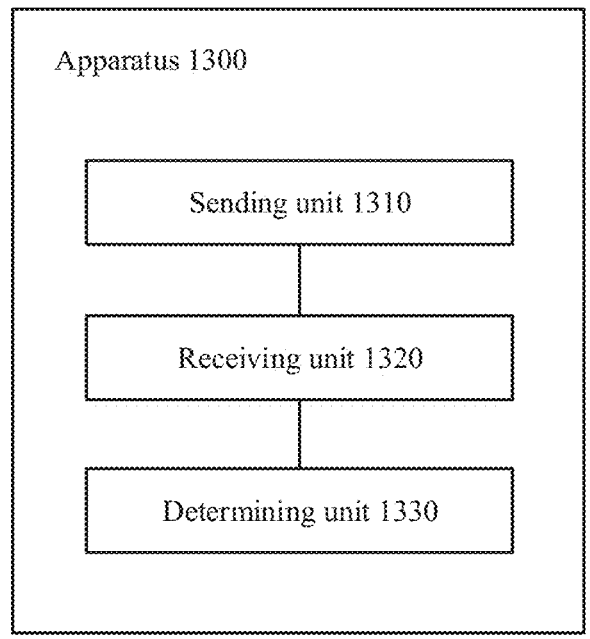
FIG. 13 is a schematic structural diagram of an apparatus according to another embodiment of this application.

FIG. 13 is a schematic block diagram of an apparatus 1300 according to an embodiment of this application. The apparatus 1300 may be a second communications device, and can perform the steps performed by the second communications device in the method embodiments of this application. To avoid repetition, details are not described herein again. The apparatus 1300 includes a sending unit 1310, a receiving unit 1320, and a determining unit 1330.

The sending unit 1310 sends a first data unit to a first communications device.

The receiving unit 1320 is configured to receive a second data unit from the first communications device, where the second data unit includes first time information, the first time information is used to indicate a second moment at which the first communications device receives the first data unit, and the first time information indicates the second moment based on a part of bits of a frame number.

The determining unit 1330 is configured to determine a first delay from the second communications device to the first communications device based on a first moment and the second moment, where the first moment is a moment at which the second communications device sends the first data unit.

Figure 14:
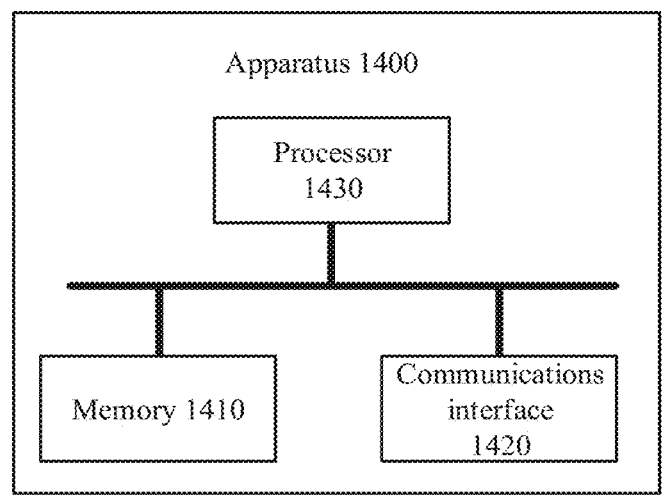
FIG. 14 is a schematic structural diagram of an apparatus according to another embodiment of this application.

FIG. 14 is a schematic block diagram of an apparatus 1400 according to an embodiment of this application. It should be understood that the apparatus 1400 may be a first communications device, and can perform the steps performed by the first communications device. To avoid repetition, details are not described herein again. The apparatus 1400 includes:

a memory 1410, configured to store a program:

a communications interface 1420, configured to communicate with another device, and a processor 1430, configured to: execute the program in the memory 1410, where when the program is executed, the processor 1430 is configured to receive a data unit from a second communications device through the communications interface 1420, the data unit includes time information, the time information is used to indicate a first moment at which the second communications device sends the data unit, and the time information indicates the first moment based on a part of bits of a frame number; and determine a delay from the second communications device to the first communications device based on the first moment and a second moment, where the second moment is a moment at which the first communications device receives the data unit.

Alternatively, the processor 1430 is configured to: receive a first data unit from a second communications device through the communications interface 1420; and send a second data unit to the second communications device through the communications interface 1420, where the second data unit includes first time information, the first time information is used to indicate a second moment at which the first communications device receives the first data unit, and the first time information indicates the second moment based on a part of bits of a frame number.

Figure 15:
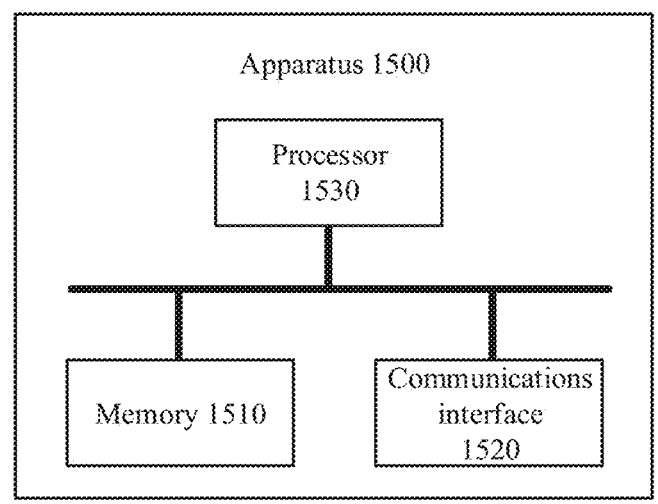
FIG. 15 is a schematic structural diagram of an apparatus according to another embodiment of this application.

FIG. 15 is a schematic block diagram of an apparatus 1500 according to an embodiment of this application. It should be understood that the apparatus 1500 may be a second communications device, and can perform the steps performed by the second communications device. To avoid repetition, details are not described herein again. The apparatus 1500 includes:

a memory 1510, configured to store a program:

a communications interface 1520, configured to communicate with another device: and a processor 1530, configured to: execute the program in the memory 1510, where when the program is executed, the processor 1530 is configured to send a data unit to a first communications device through the communications interface 1520, the data unit includes time information, the time information is used to indicate a first moment at which the second communications device sends the data unit, and the time information indicates the first moment based on a part of bits of a frame number; and receive delay information from the first communications device through the communications interface 1520, where the delay information indicates a delay from the second communications device to the first communications device, the delay is determined based on the first moment and a second moment, and the second moment is a moment at which the first communications device receives the data unit.

Alternatively, the processor 1530 is configured to: send a first data unit to a first communications device through the communications interface 1520; receive a second data unit from the first communications device through the communications interface 1520, where the second data unit includes first time information, the first time information is used to indicate a second moment at which the first communications device receives the first data unit, and the first time information indicates the second moment based on a part of bits of a frame number: and determine a first delay from the second communications device to the first communications device based on a first moment and the second moment, where the first moment is a moment at which the second communications device sends the first data unit.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the unit is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A delay measurement method, comprising:
receiving, by a first communications device, a data unit from a second communications device, wherein the data unit comprises time information, wherein the time information is used to indicate a first moment at which the second communications device sends the data unit, and wherein the time information includes a part of bits of a frame number at the first moment; and
determining, by the first communications device, a delay from the second communications device to the first communications device based on the first moment and a second moment, wherein the second moment is a moment at which the first communications device receives the data unit.

2. The method according to claim 1, wherein the part of bits of the frame number comprises last N bits of the frame number, and wherein N is an integer greater than or equal to 1.

3. The method according to claim 1, wherein the time information comprises at least one of the part of bits of the frame number corresponding to the first moment, a subframe number corresponding to the first moment, a slot sequence number corresponding to the first moment, or a symbol sequence number corresponding to the first moment.

4. The method according to claim 1, wherein the time information corresponds to a first subcarrier spacing.

5. The method according to claim 1, wherein the method further comprises:
sending, by the first communications device, delay information to the second communications device, wherein the delay information comprises the delay.

6. The method according to claim 1, wherein a value of the part of bits of the frame number at the first moment is N1, a value of the part of bits of the frame number at the second moment is N2, and the delay is determined to be a time unit represented by (N2−N1)*1 frames when N1≤N2.

7. The method according to claim 1, wherein a value of the part of bits of the frame number at the first moment is N1, a value of the part of bits of the frame number at the second moment is N2, the part of bits of the frame number comprises N bits of the frame number, N is an integer greater than or equal to 1, and the delay is determined to be a time unit represented by $(2^N-N1+N2)*1$ frames when N1>N2.

8. A delay measurement method, comprising:

sending, by a second communications device, a data unit to a first communications device, wherein the data unit comprises time information, wherein the time information is used to indicate a first moment at which the second communications device sends the data unit, and wherein the time information includes a part of bits of a frame number at the first moment; and receiving, by the second communications device, delay information from the first communications device, wherein the delay information indicates a delay from the second communications device to the first communications device, wherein the delay is determined based on the first moment and a second moment, and wherein the second moment is a moment at which the first communications device receives the data unit.

9. The method according to claim 8, wherein the part of bits of the frame number comprises last N bits of the frame number, and wherein N is an integer greater than or equal to 1.

10. The method according to claim 8, wherein the time information comprises at least one of the part of bits of the frame number corresponding to the first moment, a subframe number corresponding to the first moment, a slot sequence number corresponding to the first moment, or a symbol sequence number corresponding to the first moment.

11. The method according to claim 8, wherein the time information corresponds to a first subcarrier spacing.

12. A delay measurement apparatus, wherein the apparatus is a first communications device and comprises:

a receiver, the receiver configured to receive a data unit from a second communications device, wherein the data unit comprises time information, wherein the time information is used to indicate a first moment at which the second communications device sends the data unit, and wherein the time information includes a part of bits of a frame number at the first moment; and at least one processor, the at least one processor configured to determine a delay from the second communications device to the first communications device based on the first moment and a second moment, wherein the second moment is a moment at which the first communications device receives the data unit.

13. The apparatus according to claim 12, wherein the part of bits of the frame number comprises last N bits of the frame number, and wherein N is an integer greater than or equal to 1.

14. The apparatus according to claim 12, wherein the time information comprises at least one of the part of bits of the frame number corresponding to the first moment, a subframe number corresponding to the first moment, a slot sequence number corresponding to the first moment, or a symbol sequence number corresponding to the first moment.

15. The apparatus according to claim 12, wherein the time information corresponds to a first subcarrier spacing.

16. The apparatus according to claim 12, wherein the apparatus further comprises a transmitter, the transmitter is configured to send delay information to the second communications device, and wherein the delay information comprises the delay.

17. A delay measurement apparatus, wherein the apparatus is a second communications device and comprises:

a transmitter, the transmitter configured to send a data unit to a first communications device, wherein the data unit comprises time information, wherein the time information is used to indicate a first moment at which the second communications device sends the data unit, and wherein the time information includes a part of bits of a frame number at the first moment; and a receiver, the receiver configured to receive delay information from the first communications device, wherein the delay information indicates a delay from the second communications device to the first communications device, wherein the delay is determined based on the first moment and a second moment, and wherein the second moment is a moment at which the first communications device receives the data unit.

18. The apparatus according to claim 17, wherein the part of bits of the frame number comprises last N bits of the frame number, and wherein N is an integer greater than or equal to 1.

19. The apparatus according to claim 17, wherein the time information comprises at least one of the part of bits of the frame number corresponding to the first moment, a subframe number corresponding to the first moment, a slot sequence number corresponding to the first moment, or a symbol sequence number corresponding to the first moment.

20. The apparatus according to claim 17, wherein the time information corresponds to a first subcarrier spacing.

* * * * *